United States Patent

[11] 3,614,040

[72] Inventor  Eugene Martinez
              Irvington, N.Y.
[21] Appl. No. 10,345
[22] Filed     Feb. 11, 1970
[23]           Division of Ser. No. 715,621, Mar. 25, 1968, Pat. No. 3,522,943.
[45] Patented  Oct. 19, 1971
[73] Assignee  Robert H. Reibel
              Croton-On-Hudson, N.Y.
              a part interest

[54] STAND FOR PROJECTOR
     10 Claims, 9 Drawing Figs.
[52] U.S. Cl. ................................................ 248/11,
                                248/137, 248/175, 353/119
[51] Int. Cl. ............................................... F16m 13/00
[50] Field of Search ..................................... 248/141,
     142, 447, 454, 136, 137, 140, 139, 11, 12, 13, 175;
                                                    353/119

[56]              References Cited
              UNITED STATES PATENTS
Des. 175,258  8/1955   McStay ............... 248/137 UX
1,593,052     7/1926   Ames .................. 248/11 X
1,972,654     9/1934   Heath .................. 248/13 X
2,808,219    10/1957   Petrick ................ 248/175 X Primary Examiner—J. Franklin Foss
Attorney—J. B. Felshin ABSTRACT: A projector having a molded plastic outer case which is supported by a curved steel stand which also serves as an elevating device and carrying handle. The projector can be tilted simply by sliding it up on the curved stand and locking it with two knobs. An electric lamp is mounted at a center location within the case and a pair of heat dissipating baffle plates are positioned on opposite sides of the lamp. A cover is positioned over the lamp and baffle plates to direct the cooling air rising adjacent the lamp toward the rear of the projector. A film advance mechanism is housed in the case and includes an arm which engages the film sprocket holes only during the advancing operation.

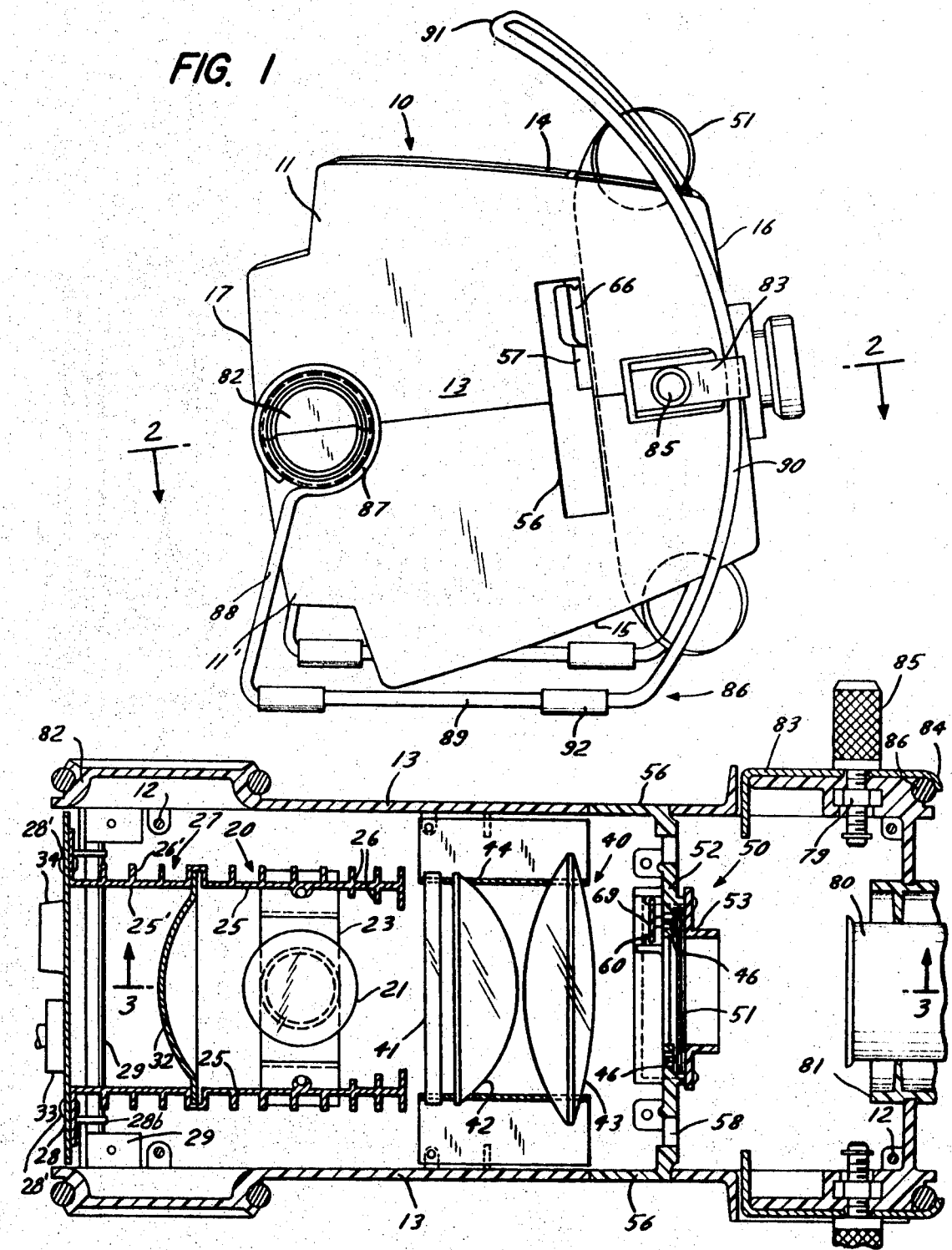

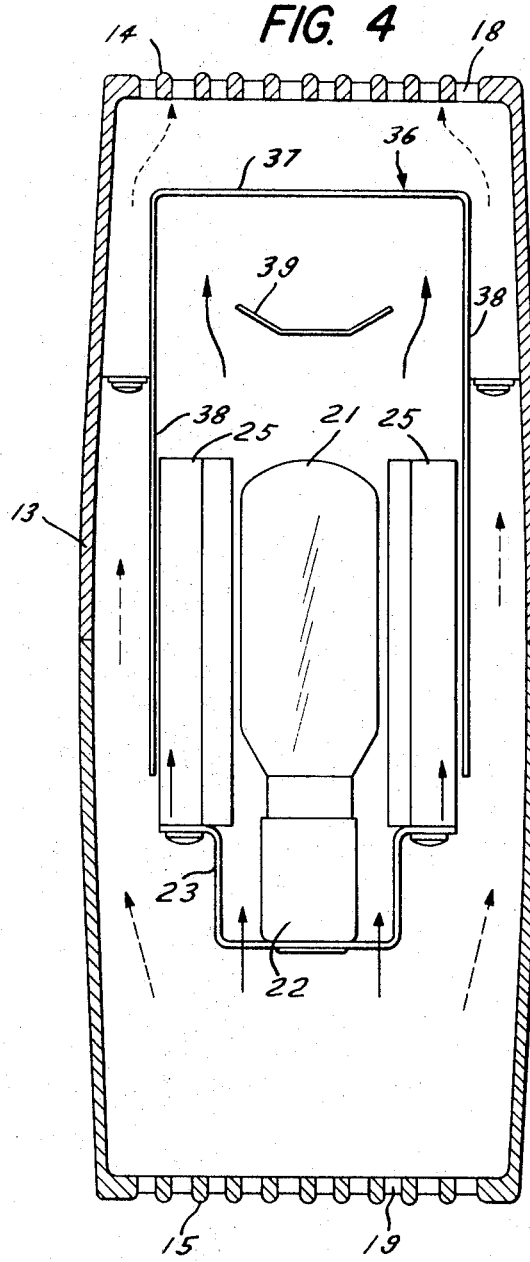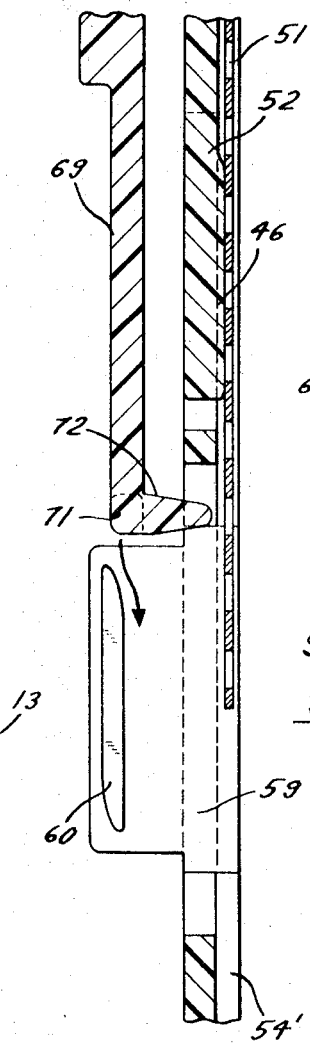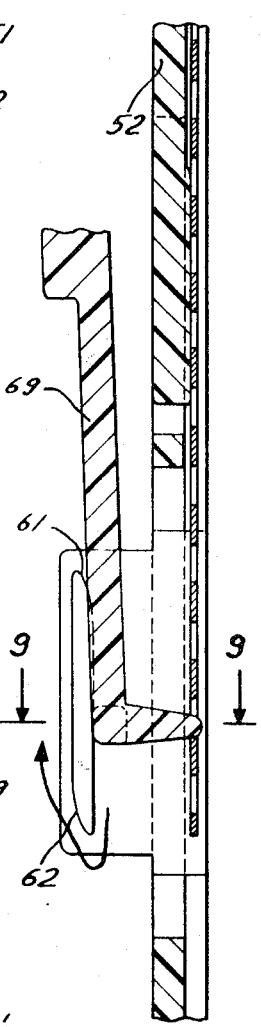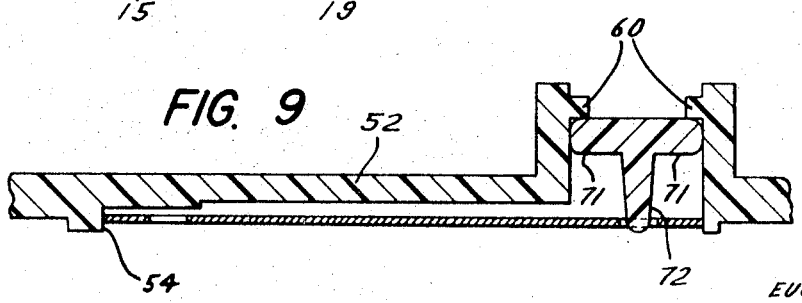

STAND FOR PROJECTOR

This application is a division of application Ser. No. 715,621 now U.S. Pat. No. 3,522,943 filed Mar. 25, 1968 for a "Projector."

BACKGROUND AND SUMMARY OF THE INVENTION

This invention relates to a simple, safe and silent projector for individual and small group instruction. In the illustrated embodiment, the projector is adapted for use with conventional filmstrips of the type commonly used by educational institutions as a supplement to regular teaching methods. The potential for this system has never been fully realized since conventional projectors are complex, expensive, and dangerous when operated by small children.

In a broad sense, this invention relates to a filmstrip projector having a molded plastic case enclosing the projection apparatus. A stand for adjustably supporting the case between a horizontal and an inclined position is attached to each side by means of an integral cylindrical ear adjacent the rear of the case and a clamping means at the front of the case. The stand comprises a pair of rods positioned on opposite sides of the case, each rod being rotatably mounted about the cylindrical ear. The stand also includes a segment forming an arc of a circle about the cylindrical ear and which is releasably secured by the clamping means to the front of the case. By releasing the clamping means, the inclination of the projector relative to the stand may be easily varied by merely rotating the projector about the axes of the two cylindrical ears.

The case of the projector generally comprises a pair of substantially parallel sidewalls, upper and bottom walls having air vents therein, and front and rear walls. An electric lamp is mounted at a center location within the case, and a pair of parallel baffle plates are mounted on opposite sides of the lamp. An inverted U-shaped cover is positioned above the lamp and baffle plates, the cover having an inclined upper transverse surface for deflecting the air rising adjacent the lamp to the vent holes at the rear of the case upper wall.

The projector also includes a film advance mechanism which incorporates two closely spaced parallel plates defining a passageway for the filmstrip through the projector. One of the plates has an aperture opening to the area occupied by the sprocket holes of the film and which extends in the direction of film advance. A cam is positioned on one side of this plate adjacent the aperture and also extends in the direction of film advance. An advancing slider is mounted on the plate for translation between a rear and forward position, the slider having an elongated extension with a cam follower at the end thereof which is adapted to engage the cam when the slider is translated between the rear and the forward positions. A transverse arm is also positioned at the end of the extension such that when the cam follower engages the cam, the arm is projected through the aperture and into engagement with the sprocket holes of the film. Upon continued translation, the film is advanced a distance corresponding to the length of the cam.

It is an object of the present invention to provide a projector which is so simple in design that it may be easily operated by a child, and thus may be used individually or in a small group without the necessity of a teacher being present. It is a further object to provide a projector which may be easily and quickly "setup," and wherein the body of the projector is supported by a curved steel stand that doubles as an elevating device and carrying handle. The projector can be tiled up to 30° elevation simply by sliding it up the steel stand and locking it with two knobs. Thus, the use of books and other makeshift props under the projector is eliminated.

It is also an object of this invention to provide a projector which incorporates a frame advance mechanism which is completely free of the film when it is not being actuated. Thus, a child could pull as hard as possible on the film up or down, and the film will slide freely, undamaged in either direction.

It is still another object to provide a projector wherein the outer walls stay cool during operation without the need for a cooling fan. A double wall construction is utilized to dissipate the heat of the lamp by the normal convection currents which pass the walls on each side of the lamp. The elimination of the cooling fan thus avoids the danger from rapidly turning blades. Also, the operation is absolutely silent which is a necessity when the projector is used in close proximity of a student.

These and other objects and advantages of the present invention will readily become apparent to one skilled in the art from the following detailed description.

BRIEF DESCRIPTION OF THE DRAWINGS

FIG. 1 is a perspective view showing the projector case and its associated stand;

FIG. 2 is a horizontal sectional view taken along the line 2—2 of FIG. 1;

FIG. 4 is a vertical sectional view taken along the line 4—4 of FIG. 2;

FIG. 7 is an enlarged sectional view taken along the lines 7—7 of FIG. 6;

FIG. 8 is a view similar to FIG. 7 showing the cam follower engaged during the film advance operation; and FIG. 9 is a view taken along the line 9—9 of FIG. 8.

DESCRIPTION OF THE PREFERRED EMBODIMENT

Figure 3:
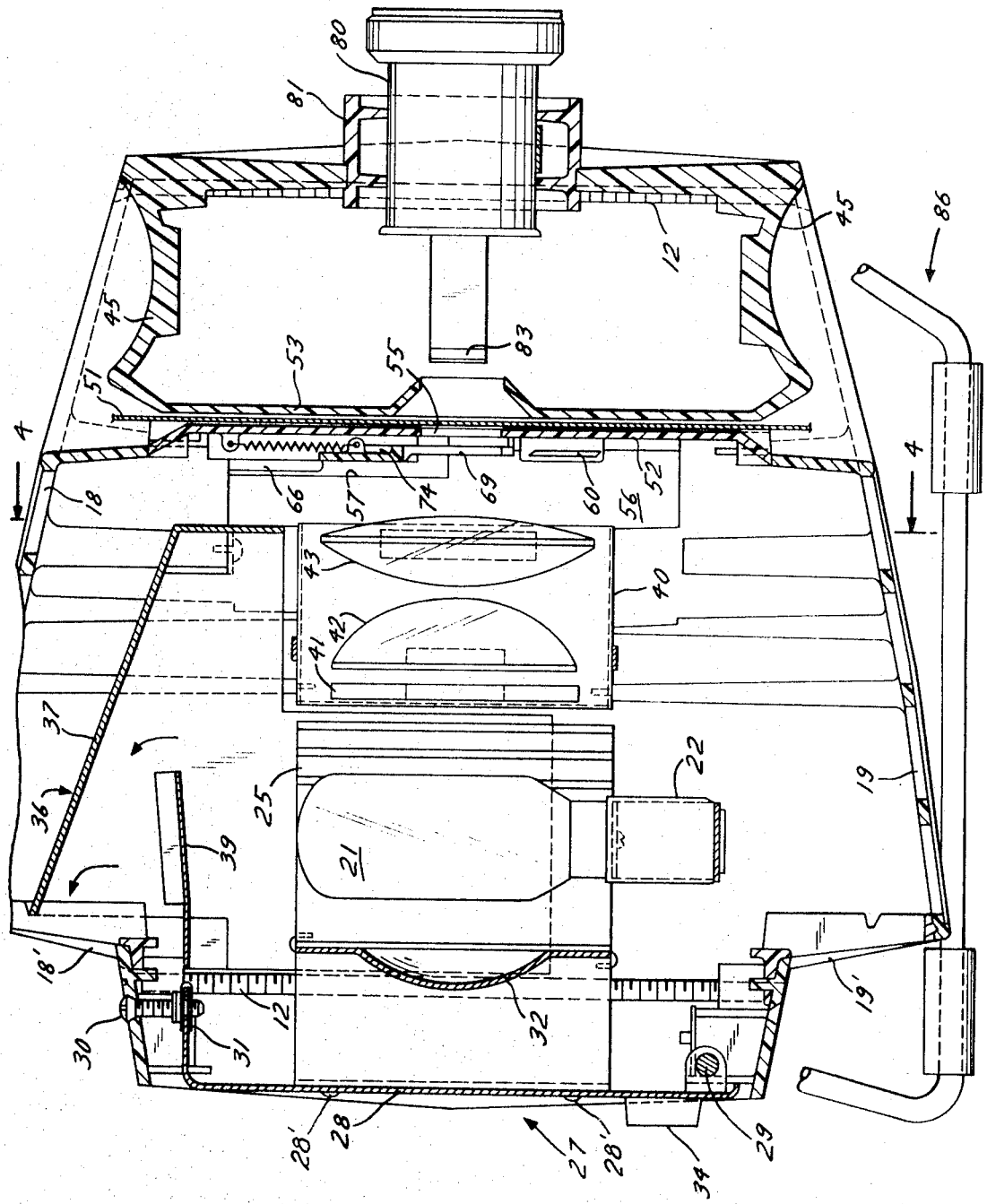
FIG. 3 is a vertical sectional view taken along the line 3—3 of FIG. 2.

Referring to the drawings, a projector incorporating the features of the present invention is designated generally at 10. The outer case of the projector comprises an upper section 11 and a lower section 11' which are joined by suitable bolts 12 to form an enclosure for the projection apparatus. The case may be described as a somewhat rectangular box having two parallel sidewalls 13, and upper wall 14, a bottom wall 15, a front end 16, and a rear end 17.

As will become apparent from the following description, the two case sections 11 and 11' are themselves identical in configuration, a fact which greatly contributes to cost reduction and simplicity of design. The case is preferably formed from a molded high impact thermoplastic material, such as the acrylonitrile-butadiene-styrene thermoplastic resin Cycolac, produced by the Marbon Chemical Division of Borg-Warner Corporation. The case is suitably shaped to provide means for attaching the various internal projector components. The upper wall 14 is provided with a plurality of air vents 18 and 18' (note FIGS. 3 and 4) while the lower wall 15 has similar vents 19 and 19'.

Viewing FIG. 2, it will be seen that the internal projection apparatus includes as essential elements an electric lamp assembly 20, a rear access door assembly 27, a lens condenser assembly 40, a film guide and advance mechanism 50, and a forward focusing lens 80.

The lamp assembly 20 includes a standard projector lamp 21 having a bayonet base for mounting in a conventional socket 22. The socket is connected to an appropriate electrical wire (not shown), and is suitably mounted in the case by means of a strap 23.

A pair of baffle plates 25 are mounted on opposite sides of the lamp in generally parallel and spaced relation to the sidewalls 13. The plates 25, which may be formed from extruded aluminum, include a plurality of vertically extending transverse ribs 26 which are designed to facilitate heat dissipation and which may be positioned either on one or both sides of the plate.

Access to the lamp 21 for replacement is provided by the rear access door assembly 27. As seen in FIG. 3, the assembly 27 includes a back 28 which pivots about the hinge pin 29. The back 28 is releasably secured at its upper end to the case by a Nylon screw 30 which engages a sheet metal nut 31 clipped to the back. Thus, upon withdrawal of the screw 30, the back 28 swings to a generally horizontal position for easy access to the lamp.

The back 28 also retains a pair of rear baffle plates 25' which are designed for alignment with the baffle plates 25 hen the back is closed. The baffle plates 25' may include transverse ribs 26' for dissipating heat in a manner similar to the ribs 26. A back reflector 32, which preferably has a chromed surface, is secured to the forward end of the plates 25' and is designed to reflect the light from the lamp 21 through the lens condenser assembly. The back 28 may also include an aperture 33 for an electric cord, as well as a switch 34.

The baffle plates 25' are secured to rear door 28 by rivets 28a. Pivot pin 29 rotatably passes through apertures in ears 28b fixed to the flanges 25a on baffle plates 25'. The ends of pivot pin 29 are fixed to blocks 29a fixed to the sidewalls 13 of the case.

A cover 36, having a generally inverted U-shape in cross section, is positioned above the lamp 21 and baffle plates 25 for the purpose of directing the flow of cooling air. The cover 36, which may be made from sheet metal, includes an upper transverse wall or surface 37 and two parallel depending side flanges or edges 38 (FIG. 4) which are generally aligned in a direction parallel to the baffle plates 25. In the embodiment shown, the edges 38 extend downwardly to a point adjacent the bottom of the plates 25 to overlie and substantially enclose the entire lamp assembly. It should be understood, however, that the side edges 38 could be designed to extend only to the top portion of the baffle plates 25, or to any intermediate position therealong without impairment of the cooling effect. If the side edges 38 extend only to the top of the plates, the edges may also be designed to lie in the same plane as the plates rather than lying outside of this plane as shown in FIG. 4.

Positioned immediately above the lamp 21 is a light deflector 39 which is suitably mounted to the upper section 11 of the case. The deflector 39 serves to prevent the bright light of the lamp from being reflected through the openings 18' by the transverse surface 37.

Viewing FIG. 4, it will be apparent that there exist in the present design two independent air passages for dissipating the heat generated by the lamp. In the first and primary passage (designated by the solid arrows in FIGS. 3 and 4), the air which initially enters through the lower air vents 19 and 19' passes immediately adjacent to the lamp 21 within the area defined by the side edges 38 of the cover, the back reflector 32 and the condenser lens assembly 40. The air is warmed by contact with these surfaces (as well as the baffle plates 25) and continues to rise until it reaches the transverse surface 37 which is inclined toward the rear of the case to direct the flow through the upper vents 18' (note FIG. 3). By this arrangement, the warm air is directed away from the film as well as the areas which come in contact with the operator's hands. It will be noted that if the side edges 38 extend only to the top of the plates 25, the plates themselves will serve as the boundary for the primary passage.

In the secondary cooling system (designated by the broken arrows), a portion of the air entering through the lower vents 19 and 19' passes along the wall formed by the outside surface of the side edges 38 to the upper vents 18. This current of air serves to insulate the sidewalls 13 of the case from the warm elements of the projector such that the sidewalls 13 remain cool and may be touched without danger of burning.

The lens-condenser assembly 40 includes a heat filter 41, a meniscus condenser 42, and a biconvex condenser 43 which are aligned in the direction of light projection. A suitable frame 44 is designed to retain the three elements of this assembly within the case.

The film 51 is designed to be inserted through a passageway in the film advance assembly 50 defined by a back plate 52 and d front plate 53, (note FIGS. 2-3). The two plates may be molded from a high strength, heat resistant plastic material such as the polyamide resin Zytel, which is sold by DuPont. They are mounted in the case by a conventional structure which has not been illustrated in detail herein. To facilitate retention of the film 51 adjacent the outer ends of the passageway, a semicircular recess 45 may be formed in the case, (note FIG. 3).

Figure 5:
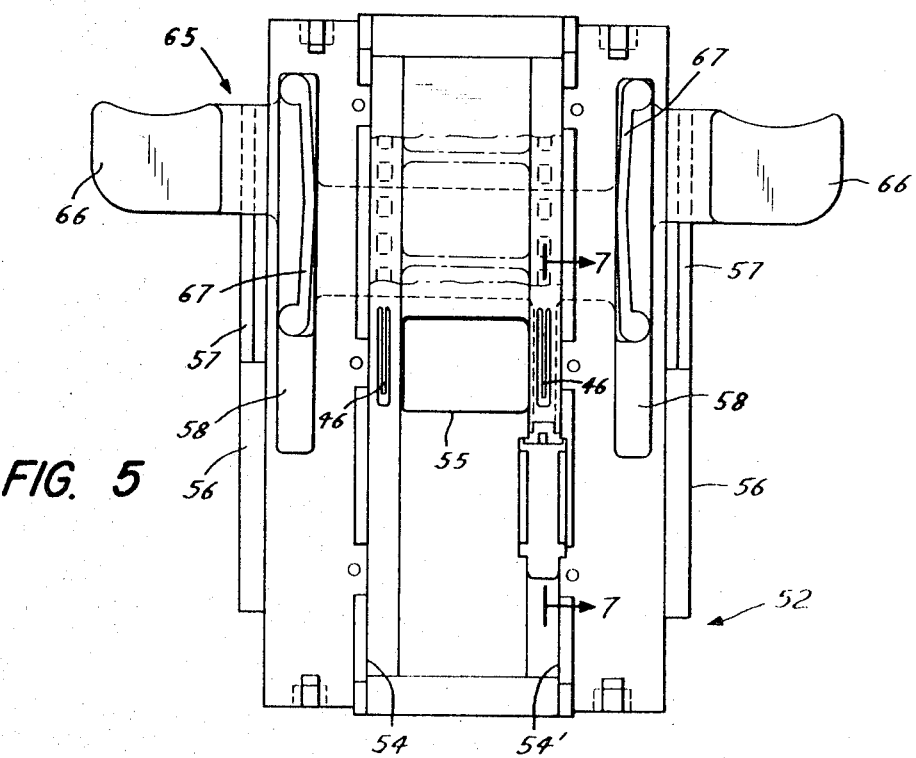
FIG. 5 is a fragmentary front view of the back plate and its associated advancing slider.
Figure 6:
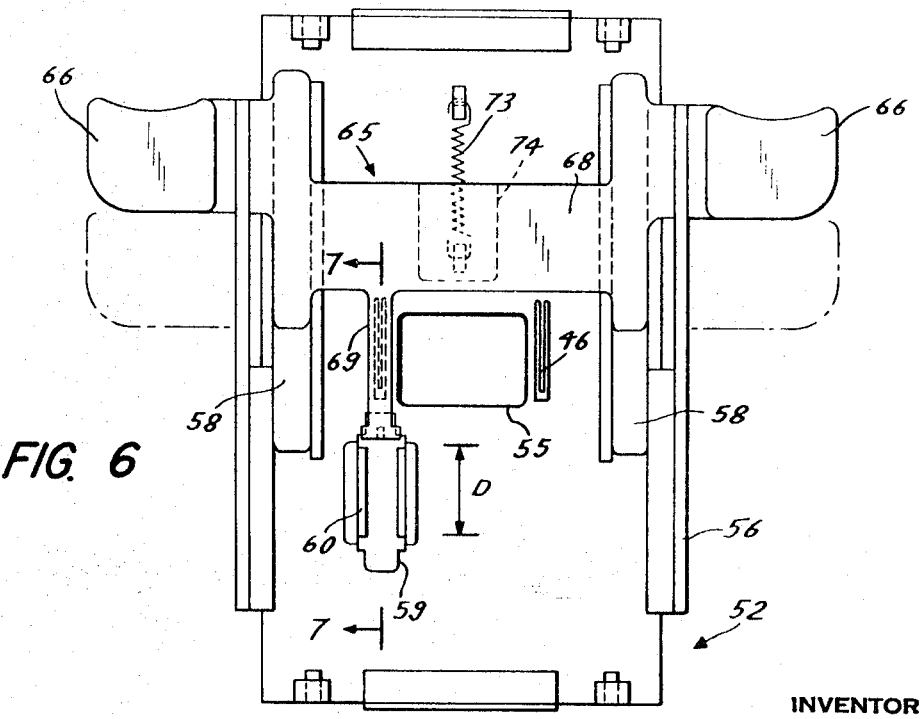
FIG. 6 is a fragmentary rear view of the back plate and its associated advancing slider.

As seen in FIGs. 5–6, the film passageway across the back plate 52 includes a vertical channel defined by the edge abutments 54 and 54' which guide the film 51 past a rectangular opening 55. The opening 55 serves to frame the light emanating from the lamp 21 such that when the individual film image is aligned with the opening, the projected picture will be properly "framed" on the screen. The channel may also incorporate a finger 46 on either side of the opening 55 (see also FIG. 2) projecting into said channel to reduce the amount of transverse clearance in the passageway at the point of projection, and thereby prevent inadvertent changes of focusing, and also to prevent the film from moving longitudinally while arms 72 are not in the sprocket holes.

The back plate 52 further includes a transversely directed side arm 56 positioned along each vertical edge, the arms having a cutout 57 in the upper portion thereof. A vertical slot 58 is positioned in the body of the plate 52 on each side of the opening 55, and an aperture 59 is positioned below the opening 55 such that it opens to the area of the sprocket holes of the film 51. A cam 60 is positioned on the side of the plate 52 opposite the film 51 and in general alignment with the aperture 59 but in spaced relation thereto, see FIGS. 7-9. The cam 60 is bifurcated (FIG. 9) and includes a forward camming surface 61 and a rear camming surface 62.

When the back plate 52 is mounted in the case, it will be seen in FIGS. 1 and 3 that the side arms 56 are positioned in appropriate slots in the case sidewall 13 such that the arms are substantially flush with the outer surfaces of the walls. This structure gives rise to a pleasing appearance as well as increased rigidity.

An advancing slider member 65 is associated with the back plate 52 to complete the film advance mechanism. The member 65 includes oppositely extending finger-engaging surfaces 66 which are designed to pass through the cutouts 57, such that the member is retained to the plate 52. The member 65 is also retained by two longitudinal shoulders 67 which are designed to be received in the slots 58 of the plate. The midportion of the member comprises a crossbar 68 from which a longitudinal extension 69 projects toward the aperture 59 and cam 60. The lower end of the extension 69 is generally T-shaped in cross section, the two outer extremities of the upper portion (as seen in FIG. 9) being a cam follower 71 and the remaining portion being a transverse arm 72 which is directed toward the aperture 59.

During the film advance operation, the member 65 is translated between a rear (rest) and forward (actuated) position, (note FIG. 6). The member is controlled and guided during this translation by the interaction between the surfaces 66 and cutouts 67, as well as between the shoulders 67 and slots 58. It will be seen that the shoulders 67 limit the extent of the translation in both directions by engaging the ends of the slots 58.

As the member advances to the forward position, the cam follower 71 of the extension 69 engages the forward camming surface 61. This inturn causes the transverse arm 72 to pass through the opening 59 and engage the sprocket holes of the film 51, (note FIGS. 7-8). Upon continued translation, the follower 71 advances the film until the bottom end of the cam 60 is reached, at which point the arm 72 releases the film and withdraws through the aperture 59.

The member 65 and plate 52 may have an interconnecting spring 73 to automatically return the member to its rear position. In the illustrated embodiment, the member includes a groove 74 along the back surface of the crossbar 68 to provide a clearance for the spring 73.

Upon translation of the member from its forward to its rear position, the follower 71 engages the rear camming surface 62 such that the arm 72 will be completely removed from the aperture 59 during the return movement. The inherent resilience of the extension 69 provides sufficient flexibility to permit the required transverse movement of the arm 72.

It will be apparent that by properly determining the length of the cam 60 (designated D in FIG. 6), the film 51 can be made to sequentially advance a predetermined distance. By design, this distance will correspond to the distance between the individual frames on the film 51 such that upon actuation of the member 65, the film will advance to the next picture frame without further adjustment. It will also be seen that the crossbar 68 is designed to cover the aperture 55 during the advancing operation such that the new frame will not be projected on the screen until the member is released.

It will now be appreciated that the advance mechanism engages the film only during the advancing operation. At all other times the film is completely free of the mechanism and may be fed through the assembly and framed merely by inserting and adjusting the film from above. Also, this feature protects the film from damage should it be given a sudden pull in either direction, as might be done by a child.

A conventional focusing lens 80 is supported by a housing 81 which is suitably secured in the case. The interconnection between the lens and housing, as shown for example in FIG. 3, provides a simple, push-pull focusing system.

The projector is supported by a curved stand 86 which doubles as an elevating device and carrying handle. The stand may be made from a single piece of chrome-plated steel rod which is suitably formed or bent into the desired final shape. The stand 86 is joined to the case of the projector by a connecting structure which includes a cylindrical ear 82 positioned on each sidewall 13 adjacent the rear of the projector, and a clamp 83 positioned on each sidewall adjacent the front of the projector. The clamp 83 includes a lip 84 for engaging the stand, and is releasably connected to the case by means of a threaded knob 85 which engages a nut 79 permanently secured in the case.

A portion of the stand 86 is positioned on each side of the projector, the two portions being identical in shape and joined by a connecting segment across the top of the projector. The free end of the stand on each side of the case is formed into the shape of a cylindrical loop 87 which is adapted to be rotatably mounted on and retained by the ear 82.

Adjacent the loop 87 is a vertical segment 88 extending downwardly a sufficient distance to lift the case from the supporting structure or table. Next is a horizontal segment 89 which extends for a distance comparable to the overall length of the projector and which is designed to rest upon the supporting table. The opposite end of the horizontal segment 89 is jointed to an arcuate segment 90 which is formed into a section of a circle having a center which corresponds to the center of the cylindrical loop 87. The arcuate segment 90 extends above the projector and is joined to the arcuate segment of the opposite side of the case by a connecting segment 91 which also serves as a carrying handle for the projector.

As will be seen in FIG. 2, the lip 84 of the clamp presses the arcuate segment 90 of the stand against the body of the case to lock the stand in position when the knob 85 is tightened. When the knob 85 is loosened, the clamp releases the stand for rotation about the axes of the cylindrical ears 82. By this arrangement, the inclination projector may easily be adjusted anywhere between the horizontal and an angle of approximately 30°. If desired, rubber feet 92 may be positioned on the horizontal segment 89 of the stand to increase the frictional contact between the stand and its supporting table.

While a specific embodiment of this invention has been disclosed in considerable detail herein, it should be understood that the scope of the invention is to be determined by that of the following claims only.

What is claimed is:

1. A film projector including a case for enclosing the projecting apparatus, said case having a pivot adjacent one end and clamping means adjacent the opposite end, a stand for adjustably supporting said case between a horizontal and an inclined position, said stand made of a single piece of wire rod and comprising a pair of portions positioned on opposite sides of said case, each of said portions having means rotatably mounted to said case about said pivot and means forming an arc of a circle about the transverse axis of said pivot, said clamping means comprising means to releasably engage said arcuate means of said portions, whereby the inclination of the projector relative to the stand may be varied.

2. The combination of claim 1, said stand having a handle portion for carrying said projector, interconnecting said portions positioned on opposite sides of said case.

3. The combination of claim 2, said member having a said portion to rest on said supporting surface.

4. The combination of claim 3, said resting portion of said stand being spaced below said case, and shock absorbing means on said resting portion, to contact said supporting surface.

5. The combination of claim 1, projection means in said case comprising a lens assembly, and the axis of said assembly passing through the said transverse pivotal axis.

6. In combination, a film projector having an outer case substantially enclosing the film-projecting apparatus, said case including two substantially parallel sidewalls, each of said sidewalls having a transversely extending cylindrical ear on the outer surface thereof, the axes of the two ears being substantially coaxial and positioned toward one end of the projector, each of said sidewalls further having a releasable clamping means adjacent the opposite end of said projector, and a stand for adjustably supporting said projector between a horizontal and an inclined position, said stand including a length of rod positioned on each side of said case, each length comprising a cylindrical loop at one end thereof which is adapted to be rotatably mounted about the ear of said case, an adjacent vertical segment extending to a position below the case, a next adjacent horizontal segment, and a next adjacent arcuate segment forming a section of a circle about the center of the cylindrical loop and extending to a position above said case, said clamping means on said case being adapted to releasably engage said arcuate segment of the stand whereby the projector can be rotated about the axes of said cylindrical ears when the clamping means is released, and whereby such rotation is precluded when said clamping means is engaged.

7. The combination as defined in claim 6 wherein the two lengths of rod are joined by a transverse segment at the ends of the arcuate segments above said projector.

8. The combination as defined in claim 7 wherein said clamping means includes a clamp having a lip for engaging said arcuate segment of said rod, and a threaded knob for releasably pressing the clamp and the rod against the case.

9. A film projector comprising a case, means for mounting said case on a supporting surface in various angular positions, said means comprising a member, means to mount said case of said member for pivotal movement about an axis, transverse of said case, and means to releasably clamp said case to said member in various angular positions of said case relative to said member, said means to pivotally mount said case on said member comprising oppositely extending ears on said case, and loops on said member rotatably engaging said ears, said member having portions extending downwardly from said loops, portions extending forwardly from said downwardly extending portions, said means for releasably clamping said case to said member, comprising arcuate portions extending from said forwardly extending portions, and clamps on said case to clampingly engage said arcuate portions.

10. The combination of claim 9, and said member further comprising a transverse handle portion interconnecting the upper ends of said arcuate portions, and disposed above said case.